March 9, 1926.
J. M. DAPRON
1,575,740
FLUID PRESSURE BRAKE
Filed April 28, 1925
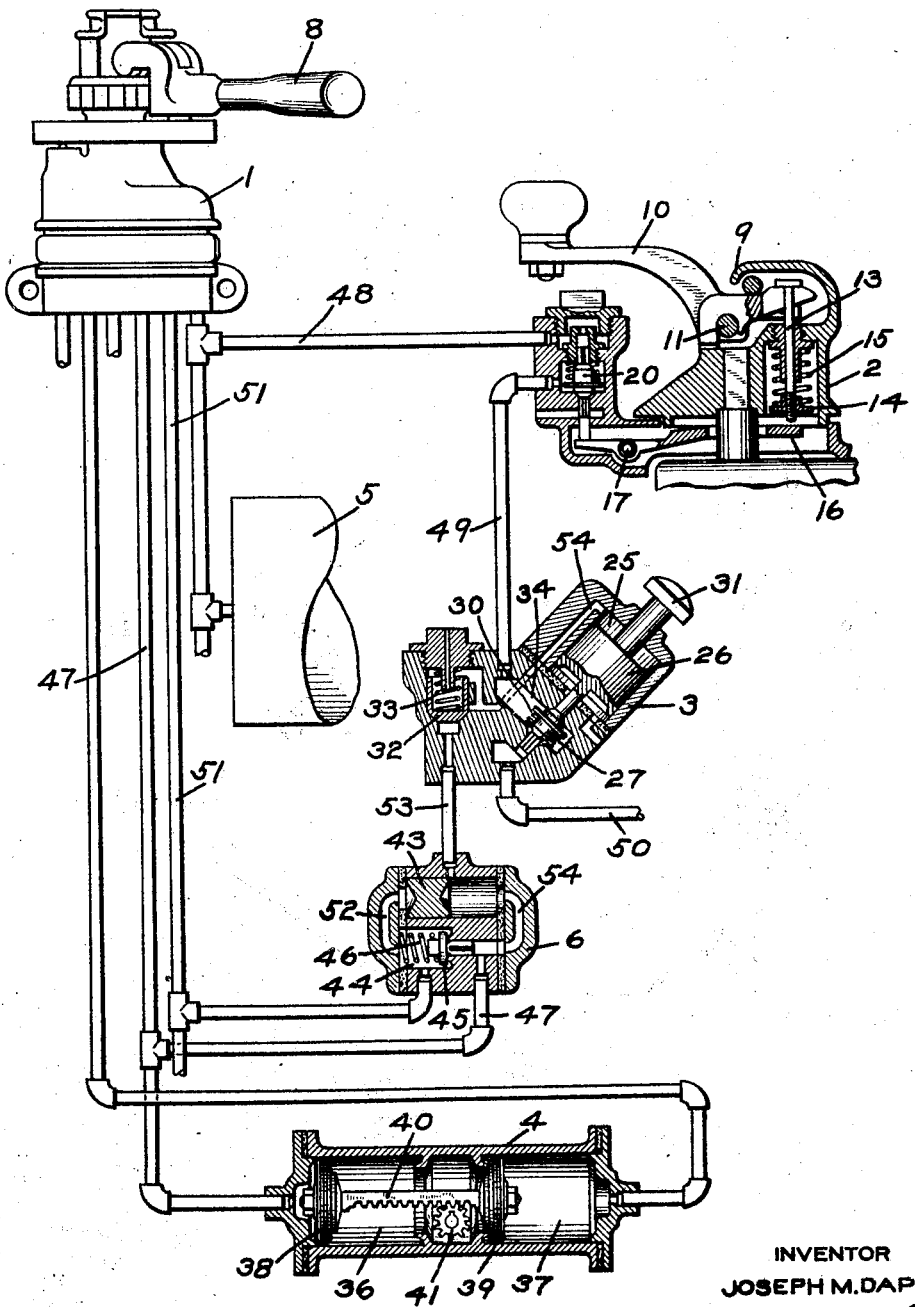
INVENTOR
JOSEPH M. DAPRON
BY Wm. M. Cady
ATTORNEY Patented Mar. 9, 1926.

1,575,740

UNITED STATES PATENT OFFICE.

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 28, 1925. Serial No. 26,403.

*To all whom it may concern:*

Be it known that I, JOSEPH M. DAPRON, a citizen of the United States, residing at St. Louis and State of Missouri, have invented new and useful Improvements in Fluid-Pressure Brakes, of which the following is a specification.

This invention relates to fluid pressure brakes, and more particularly to a safety car control equipment.

It has heretofore been proposed in a safety car equipment to maintain the brake cylinder pressure, when the car doors are open, by connecting the main reservoir to the brake cylinder in door opening position of the brake valve device. This causes an unnecessary waste of fluid under pressure, inasmuch as the operator, in stopping the car, usually reduces the brake cylinder pressure to a point just sufficient to hold the car stopped.

When the doors are then opened, full main reservoir pressure flows to the brake cylinder, while the doors are open, so that when the car is to be again started, the release of the brakes is delayed, due to the necessity of releasing the full brake cylinder volume at high pressure.

The principal object of my invention is to provide means for holding the brakes applied, while avoiding the above objections.

In the accompanying drawing, the single figure is a diagrammatic view, partly in section, of a safety car equipment, with my invention applied thereto, only such portion of the equipment being shown as is deemed necessary to a clear understanding of my invention.

According to my invention, I provide means for maintaining the brake cylinder pressure at a degree sufficient to keep the car from moving while the car doors are open, and at the same time prevent undue waste of fluid under pressure.

As shown in the drawing, the equipment may comprise a brake valve device 1, an electric controller operating device 2, a foot valve device 3, a door engine 4, main reservoir 5, and a valve device 6.

The electric controller operating device 2 may comprise a safety controller handle 10, which is pivotally mounted on a pin 11. One end of the handle 10 is provided with a slot for receiving pin 13, which carries a nut 14 at its opposite end. Interposed between the nut 14 and the casing 9 is a spring 15, which tends to force the pin 13 downward to engage one end of a lever 16 pivotally mounted on pin 17.

The lever 16 is adapted to operate a double beat valve 20, which is adapted in one position to connect pipe 49 with a fluid pressure supply pipe 48 and in another position with the atmosphere.

The foot valve device 3 may comprise a casing having a piston chamber 25 containing a piston 26, to the stem of which is attached a double beat valve 27. The valve 27 is normally held to its upper seat by a spring 30. The piston 26 is adapted to be operated, either by fluid under pressure or by pressure applied to a button 31, to seat the valve 27 on its lower seat against the pressure exerted by spring 30. Also contained in the foot valve device 3 is a valve 32 normally held seated by a spring 33 so as to close communication from the valve device 6 to piston chamber 25 of the foot valve device.

The door engine 4 may comprise a casing having piston cylinders 36 and 37 containing respectively pistons 38 and 39. Said pistons are connected by rack bar 40, having teeth meshing with a pinion 41, the rotation of which is adapted to open and close the car doors.

The valve device 6 may comprise a casing, containing a double check valve 43 and also having a valve chamber 44, containing a valve 45, normally held seated by a spring 46, and subject on the other side to the pressure of fluid in the usual door opening pipe 47.

In operation, when the handle 10 of the electric controller operating device is manually held down, so that the lever 16 does not engage the stem of the valve 20, said valve will be held at its lower seat so as to permit fluid under pressure from the main reservoir 5 to flow through pipe 48, past the valve 20, to pipe 49, and thence through chamber 34 past the valve 27 to the usual safety control pipe 50, charging the same.

When it is desired to stop the car, the operating handle 8 of the usual brake valve device 1 is moved to service application position, in which a connection from the main reservoir 5 to the straight air pipe 51 is made, thereby permitting fluid under pressure from the main reservoir to flow to the straight air pipe 51, thence to the brake cylinder to apply the brakes in the usual way.

When a straight air application of the brakes is made, fluid from the straight air pipe 51 flows through a branch pipe to the chamber 44 of the valve device 6, thence through passage 52, forcing the double check valve 42 to the right and continuing through pipe 53 to the face of valve 32. If the service application is of sufficient degree, the fluid in pipe 53 will raise the valve 32 and flow through passage 54 to piston chamber 25, forcing piston 26 downwardly. The downward movement of piston 26 seats the valve 27 on its lower seat and thereby prevents venting of the safety control pipe 50 and the consequent emergency application of the brakes in case the operator should remove his hand from the safety controller handle 10.

After the car has been brought to a stop and it is desired to open the doors, the handle 8 of the brake valve device 1 is moved to door opening position, in which communication from the main reservoir to the straight air brake pipe is cut off and in which fluid is supplied from the main reservoir to the door opening pipe 47. Fluid now flows to the door opening side of the door engine 4 and forces piston 38 to the right, thereby rotating the pinion 41 to effect the opening of the car doors.

Fluid also flows through a branch of the door opening pipe 47 to valve device 6, where it acts on the valve 45. Said valve is then unseated against the pressure exerted by spring 46, permitting flow of fluid from door opening pipe to the straight air pipe 51.

The spring 46 is of such resistance as to seat the valve 45 when the brake cylinder pressure has been increased to a predetermined desired degree, sufficient to hold the car when stopped, such for example as thirty pounds when the main reservoir pressure is around sixty five pounds. It will be evident that if the fluid in the brake cylinder should leak down below the predetermined pressure, the main reservoir pressure, acting on the other side of valve 45, will raise the valve and restore the pressure in the brake cylinder to the predetermined amount, as determined by the pressure exerted by the spring 46.

A passage 54 in the valve device 6 permits fluid from the door opening pipe to force the double check valve 43 to the left and thus open communication from pipe 47 to pipe 53 leading to the foot valve device. As hereinbefore described, the valve 32 is then unseated and fluid is supplied to piston chamber 25, so that piston 26 is operated to seat the valve 27 and thus prevent the venting of fluid from the safety control pipe, in case the operator should remove his hand from the controller handle.

Having now described my invention, what I claim as new and desire to secure by Letters Patent, is:—

1. The combination with a door engine having a door opening pipe, a straight air pipe, and a valve device operated by fluid under pressure for preventing an emergency application of the brakes, of a valve for permitting the flow of fluid from the door opening pipe to the brake cylinder, and a double check valve for controlling communication from the straight air pipe and from the door opening pipe to said valve device.

2. The combination with a door engine having a door opening pipe, a straight air pipe, and a valve device operated by fluid under pressure for preventing an emergency application of the brakes, of a valve for permitting the flow of fluid from the door opening pipe to the brake cylinder, a connection for supplying fluid under pressure from the straight air pipe or from the door opening pipe to said valve device, and a double check valve for controlling communication from said pipes to said valve device.

3. The combination with a door engine having a door opening pipe, a straight air pipe, and a valve device operated by fluid under pressure for preventing an emergency application of the brakes, of a valve for permitting the flow of fluid from the door opening pipe to the brake cylinder, and means for supplying fluid under pressure from said door opening pipe to said valve device.

In testimony whereof I have hereunto set my hand.

JOSEPH M. DAPRON.